US008723688B2

(12) United States Patent
Carboon et al.

(10) Patent No.: US 8,723,688 B2
(45) Date of Patent: May 13, 2014

(54) VEHICLE DETECTION

(75) Inventors: Paul Carboon, Notting Hill (AU); Stephen Toal, Hawthorn (AU); Sandy Del Papa, North Balwyn (AU)

(73) Assignee: Sarb Management Group Pty Ltd, West Melbourne (AU)

( * ) Notice: Subject to any disclaimer, the term of this patent is extended or adjusted under 35 U.S.C. 154(b) by 681 days.

(21) Appl. No.: 12/674,787

(22) PCT Filed: Aug. 22, 2008

(86) PCT No.: PCT/AU2008/001244
§ 371 (c)(1),
(2), (4) Date: Aug. 18, 2010

(87) PCT Pub. No.: WO2009/023936
PCT Pub. Date: Feb. 26, 2009

(65) Prior Publication Data

US 2011/0133958 A1 Jun. 9, 2011

(30) Foreign Application Priority Data

Aug. 23, 2007 (AU) ................................ 2007904549
Aug. 21, 2008 (AU) ................................ 2008100796

(51) Int. Cl.
*B60Q 1/48* (2006.01)

(52) U.S. Cl.
USPC ........ 340/932.2; 340/928; 340/933; 340/988; 340/991; 340/10.1; 705/5; 705/12; 705/13

(58) Field of Classification Search
CPC ............................ G07B 15/02; B60Q 30/0284
USPC ............. 340/932.2, 933, 928, 988, 991, 10.1, 340/426.1; 705/5, 12, 13
See application file for complete search history.

(56) References Cited

U.S. PATENT DOCUMENTS 3,114,128 A 12/1963 Ljungman et al.
4,823,928 A 4/1989 Speas (Continued)

FOREIGN PATENT DOCUMENTS

AU 2006202968 A1 2/2007
AU 2006235864 A1 5/2007

(Continued)

OTHER PUBLICATIONS

Harper, J. G.; Traffic violation detection and deterrence: Implications for automatic policing; Applied Ergonomics; vol. 22; No. 3; pp. 189-197; Jun. 1991.

(Continued)

*Primary Examiner* — Tai T Nguyen
(74) *Attorney, Agent, or Firm* — Shay Glenn LLP

(57) ABSTRACT

A vehicle detection unit (VDU) is embedded beneath each of a plurality of parking spaces. Each VDU has a sensor which detects magnetic field fluctuations caused by the arrival and departure of a vehicle in the parking space. The VDU runs a vehicle detection algorithm to distinguish magnetic fluctuations caused by vehicles from "exceptional" magnetic fluctuations from other sources. The VDU also stores parameters which define notifiable vehicle space occupancy events. A processor of the VDU processes the sensor signal to determine occupancy status of the vehicle space, and compare the occupancy status of the vehicle space with the parameters in order to determine whether a notifiable event has occurred, such as a vehicle going into violation of parking restrictions. As necessary, the VDU initiates radio communications with a supervisory device, either a transient portable device such as a Parking Officer's PDA or a fixed radio node mounted within range.

25 Claims, 7 Drawing Sheets

(56) References Cited

U.S. PATENT DOCUMENTS

| | | | | |
|---|---|---|---|---|
| 4,825,425 | A | 4/1989 | Turner | |
| 5,029,094 | A | 7/1991 | Wong | |
| 5,153,586 | A | 10/1992 | Fuller | |
| 5,266,947 | A | 11/1993 | Fujiwara et al. | |
| 5,343,237 | A | 8/1994 | Morimoto | |
| 5,407,049 | A | 4/1995 | Jacobs | |
| 5,504,314 | A | 4/1996 | Farmont | |
| 5,570,771 | A | 11/1996 | Jacobs | |
| 5,659,306 | A | 8/1997 | Bahar | |
| 5,737,710 | A | 4/1998 | Anthonyson | |
| 5,740,050 | A | 4/1998 | Ward, II | |
| 5,777,951 | A | 7/1998 | Mitschele et al. | |
| 5,845,268 | A | 12/1998 | Moore | |
| 5,852,411 | A | 12/1998 | Jacobs et al. | |
| 6,081,206 | A | 6/2000 | Kielland | |
| 6,147,624 | A | 11/2000 | Clapper | |
| 6,275,170 | B1 | 8/2001 | Jacobs et al. | |
| 6,335,927 | B1 | 1/2002 | Elliott et al. | |
| 6,344,806 | B1 | 2/2002 | Katz | |
| 6,559,776 | B2 | 5/2003 | Katz | |
| 6,885,311 | B2 | 4/2005 | Howard et al. | |
| 7,104,447 | B1 | 9/2006 | Lopez et al. | |
| 2001/0012241 | A1 | 8/2001 | Dee et al. | |
| 2002/0030606 | A1 | 3/2002 | Chauvin et al. | |
| 2002/0065894 | A1 | 5/2002 | Dalal et al. | |
| 2002/0109609 | A1 | 8/2002 | Potter et al. | |
| 2002/0111768 | A1 | 8/2002 | Ghorayeb et al. | |
| 2002/0190856 | A1 | 12/2002 | Howard | |
| 2003/0076417 | A1 | 4/2003 | Thomas et al. | |
| 2003/0169183 | A1 | 9/2003 | Korepanov et al. | |
| 2003/0179107 | A1 | 9/2003 | Kibria et al. | |
| 2006/0136131 | A1* | 6/2006 | Dugan et al. | 701/300 |
| 2006/0212344 | A1 | 9/2006 | Marcus et al. | |
| 2008/0133572 | A1 | 6/2008 | Verhey-Henke et al. | |

FOREIGN PATENT DOCUMENTS

| | | | |
|---|---|---|---|
| AU | 2008200089 | A1 | 1/2008 |
| DE | 20003088 | | 8/2000 |
| DE | 19944311 | | 3/2001 |
| DE | 20018779 | | 6/2001 |
| DE | 10036111 | | 9/2001 |
| DE | 10019649 | | 11/2001 |
| DE | 10109103 | | 11/2001 |
| EP | 0980055 | A1 | 2/2000 |
| EP | 1355284 | | 10/2003 |
| EP | 1128350 | | 10/2007 |
| FR | 2359465 | A1 | 2/1978 |
| GB | 1017941 | | 1/1966 |
| GB | 1469503 | | 4/1977 |
| GB | 2228605 | | 8/1990 |
| GB | 2271658 | | 4/1994 |
| GB | 2284290 | | 5/1995 |
| GB | 2350921 | | 12/2000 |
| GB | 2376586 | | 12/2002 |
| JP | 3-194010 | | 8/1991 |
| JP | 3-194010 | A | 8/1991 |
| JP | 4-060489 | A | 2/1992 |
| JP | 5-210787 | A | 8/1993 |
| JP | 8-016993 | A | 1/1996 |
| JP | 8-035346 | A | 2/1996 |
| JP | 8-036694 | A | 2/1996 |
| JP | 9-305814 | A | 11/1997 |
| JP | 10-172092 | A | 6/1998 |
| JP | 2002032807 | A | 1/2002 |
| JP | 2003157455 | A | 5/2003 |
| JP | 2004110721 | A | 4/2004 |
| JP | 2004127162 | A | 4/2004 |
| KR | 2000-050413 | A | 8/2000 |
| KR | 2003-077261 | A | 10/2003 |
| KR | 405917 | B1 | 11/2003 |
| WO | WO95/20204 | A1 | 7/1995 |
| WO | WO 97/48079 | A1 | 12/1997 |
| WO | WO 99/30290 | A1 | 6/1999 |
| WO | WO 00/23949 | A1 | 4/2000 |
| WO | WO 00/41142 | A1 | 7/2000 |
| WO | WO 00/55821 | A1 | 9/2000 |
| WO | WO 01/24127 | A1 | 4/2001 |
| WO | WO 01/35264 | A1 | 5/2001 |
| WO | WO 01/63563 | A1 | 8/2001 |
| WO | WO 02/33676 | A1 | 2/2002 |
| WO | WO 02/063570 | A2 | 8/2002 |
| WO | WO 03/009238 | A1 | 1/2003 |
| WO | WO 03/025865 | A1 | 3/2003 |
| WO | WO 03/058562 | A2 | 7/2003 |
| WO | WO 2005/086097 | A1 | 9/2005 |
| WO | WO 2005/111963 | A1 | 11/2005 |
| WO | WO 2006/063079 | A2 | 6/2006 |
| WO | WO 2006/076773 | A1 | 7/2006 |
| WO | WO 2007/027818 | A1 | 3/2007 |
| ZA | 9705049 | A | 12/1998 |

OTHER PUBLICATIONS

Making a Space (newsletter); Journal of the Australian National Parking Steering Group; vol. 3; Iss. 10; Jun. 2005.

Maribyrnong City Council; Maribyrnong to introduce PODS permanently (Media Release); 5 pgs.; Jul. 12, 2006.

Wilson Technology Solutions; IXAON IMP-600 (Product Information); as pre-presentation information material.

Wilson Technology Solutions; METER-EYE SmartSpace (Product Information); as pre-presentation information material.

Wilson Technology Solutions; METER-EYE VDS II (Product Information); as pre-presentation information material.

Wilson Technology Solutions; Mobile Enforcement Technology (Product Information); as pre-presentation information material.

* cited by examiner

VEHICLE DETECTION

CROSS-REFERENCE TO RELATED APPLICATIONS

The present application claims priority from Australian Provisional Patent Application No 2007904549 filed on 23 Aug. 2007, and from Australian Innovation Patent Application No. 2009100796 by the same applicant filed on 21 Aug. 2008 and entitled "Vehicle detection", the content of each of which is incorporated herein by reference.

TECHNICAL FIELD

The present invention relates to vehicle parking compliance and in particular to automated determination of notifiable parking events.

BACKGROUND OF THE INVENTION

Vehicular parking is usually subjected to rules and regulations such as absolute prohibitions in areas in which no parking is permitted, and conditional prohibitions such as permit-only parking. Time-limited parking regulations, whether free or metered/ticketed, are also common on public roadways.

Enforcement of vehicular parking regulations can be the responsibility of either private or public agencies. Such enforcement is costly and time consuming. Typical enforcement involves a parking inspector manually inspecting all of the restricted spaces periodically, regardless of whether vehicles are actually present. Further, to identify a violation in a free time-limited zone requires that the parking inspector inspect the violating car at least twice, once to establish a time of arrival of the car (for example by chalking the tire of the car), and a second time once the permitted time period for parking has elapsed. Even in paid metered zones, such manual enforcement is inefficient as the parking inspector may fail to note an expired meter or ticket before the violating car departs, reducing the deterrent to infringers and denying fines revenue to the relevant body. It has been estimated that only 1 in 25 parking violations are identified by manual enforcement. Enforcement is made even more difficult when the spaces are distributed over a large area, such as a city block or a large, multi-level parking garage. Manual enforcement is also unable to provide historical data of parking usage, and such data is becoming of increasing importance to the implementation of parking supply and regulation.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

According to a first aspect the present invention provides a vehicle detection unit comprising:

- a sensor for outputting a sensor signal caused by occupancy of a vehicle space by a vehicle;
- a storage device carrying parameters which define notifiable vehicle space occupancy events;
- a processor operable to process the sensor signal to determine occupancy status of the vehicle space, and operable to compare the occupancy status of the vehicle space with the parameters in order to determine whether a notifiable event has occurred, and operable to initiate a communication from the vehicle detection unit to a supervisory device upon occurrence of a notifiable event.

According to a second aspect the present invention provides a method for vehicle detection by a vehicle detection unit, the method comprising:

- sensing occupancy of a vehicle space by a vehicle and outputting a sensor signal;
- retrieving from a storage device parameters which define notifiable vehicle space occupancy events;
- processing the sensor signal to determine occupancy status of the vehicle space, comparing the occupancy status of the vehicle space with the parameters in order to determine whether a notifiable event has occurred, and initiating a communication from the vehicle detection unit to a supervisory device upon occurrence of a notifiable event.

The present invention thus provides for the vehicle detection unit itself to determine whether a notifiable event has occurred.

Preferably, the vehicle detection unit communicates wirelessly directly with a portable supervisory device, for example a personal digital assistant carried by an inspector, in an ad-hoc manner at times when a notifiable event has occurred and when the portable supervisory device is in range. Such a network topology is referred to herein as a transient middle tier. Such embodiments may thus obviate the need for fixed communications infrastructure to connect the or each vehicle detection unit with a head office server, and to connect the head office server with the supervisory device, with such fixed infrastructure being referred to herein as a fixed middle tier. However, it is to be appreciated that the scope of the present invention includes embodiments in which a fixed middle tier is employed.

In further preferred embodiments of the invention, the vehicle detection unit is operable to provide information associated with the notifiable event to the supervisory device so that such information may be pre-populated into the supervisory device without requiring manual entry of such information by a parking inspector. Depending on the nature of the notifiable event such pre-population of associated information may save the inspector from manually entering up to 20 or more fields of data. Such data may for example include location information such as street name and parking bay number, vehicle occupancy duration, offence details, applicable regulations or "signage", an applicable monetary fine, historical usage data, and the like.

The notifiable event may comprise occurrence of a parking violation, an imminent parking violation, or any non-violating parking event of interest such as a change in occupancy status.

Preferably, a plurality of vehicle detection units in accordance with the first aspect of the present invention communicate with a single supervisory device such as a PDA carried by a parking inspector. The single supervisory device may thus be provided with real time reporting of the occupancy status of each of a plurality of parking spaces, including information such as the presence or absence of a vehicle in each location, a duration of occupancy of each vehicle present, a violation status of each vehicle present such as no violation, violation imminent, and in violation. Notably, due to the ability of each vehicle detection unit to determine whether notifiable events are occurring, the supervisory device is not required to possess the substantial processing power needed to make such determinations for every such vehicle detection unit.

In preferred embodiments of the present invention, the vehicle detection unit is embedded in the roadway beneath the associated parking space.

The sensor of the vehicle detection unit is preferably a magnetometer able to sense variations in magnetic field caused by the arrival, presence, departure or absence of a vehicle. In particularly preferred embodiments of the invention the magnetometer is a 3-axis magnetometer able to sense components of the magnetic field in x, y and z directions. Preferably, emphasis is placed on variations in the z-axis (vertical axis) of the magnetic field, as such variations are most likely caused by a vehicle directly above the sensor. In such embodiments the vehicle detection unit preferably comprises a vehicle detection algorithm adapted to determine whether detected variations in the sensor signal are caused by a vehicle or by some other event such as the presence of magnetic objects, in order to avoid false positives.

In preferred embodiments of the invention the vehicle detection unit is operable to receive updates to the parameters defining notifiable vehicle space occupancy events, for example when the signage associated with the parking space is altered. Such updates are preferably transmitted to the vehicle detection unit wirelessly via the same wireless communications link used by the vehicle detection unit to communicate with the supervisory device.

According to a third aspect the present invention provides a method for issuing a parking infringement notice, the method comprising:

- a portable device establishing a transient wireless connection with at least one fixed vehicle detection unit (VDU);
- the portable device obtaining from the VDU via the wireless connection data arising from a notifiable parking event detected by the VDU; and
- the portable device generating a parking infringement notice using the data obtained from the VDU.

Preferably the method of the third aspect further comprises automated pre-population of the data arising from the notifiable parking event into infringement issuing software of the portable device.

According to a fourth aspect the present invention provides a system for detecting vehicle parking infringements, the system comprising:

- a plurality of vehicle detection units (VDUs) each associated with a respective vehicle parking space and storing parameters defining notifiable vehicle space occupancy events, each VDU configured to sense occupancy of the associated vehicle space and determine by reference to the parameters whether a notifiable event has occurred, and operable to communicate wirelessly;
- a mobile supervisory device configured to wirelessly communicate with each respective VDU when brought within range, to receive information from the VDU arising from a notifiable parking event detected by the VDU, and to generate a parking infringement notice using the information obtained from the VDU.

In the fourth aspect of the invention the mobile supervisory device may be a portable digital device carried by a parking inspector or may be vehicle mounted. The supervisory device preferably collates data from a plurality of VDUs for simultaneous display to a parking officer.

BRIEF DESCRIPTION OF THE DRAWINGS

An example of the invention will now be described with reference to the accompanying drawings, in which.

DESCRIPTION OF THE PREFERRED EMBODIMENTS

Figure 1:
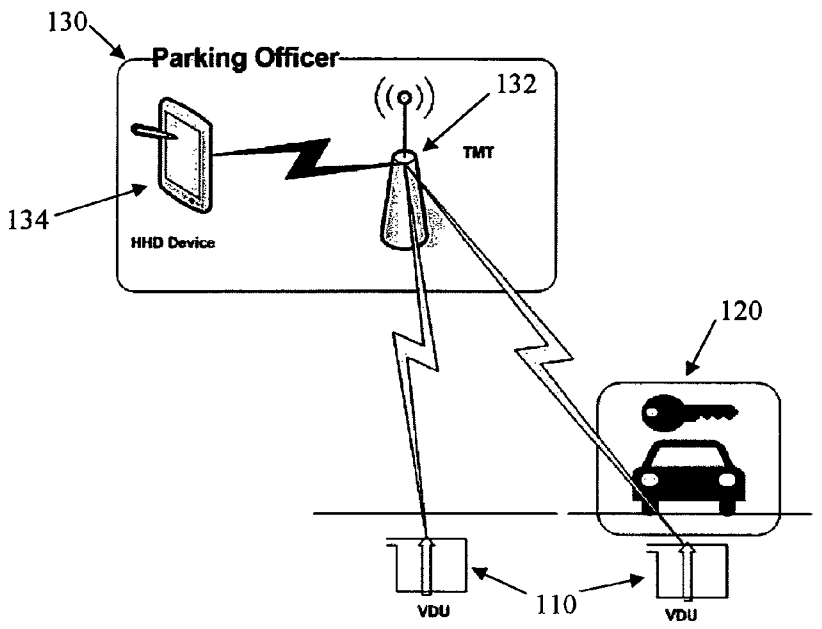
FIG. 1 illustrates a network topology comprising a transient middle tier in accordance with a preferred embodiment of the invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as “processing” or “computing” or “calculating” or “determining” or “displaying” or the like, refer to the action and processes of a computer system, or similar electronic computing device, that manipulates and transforms data represented as physical (electronic) quantities within the computer system’s registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The following acronyms and terms are used throughout the following detailed description:

Exception An exception is a case where an object other than a vehicle (such as a magnet) is placed within the vicinity of the Sensor. The VDA should detect this event and determine it to be an Exception.

False Negative: The VDU incorrectly determines the space is empty when the space is occupied.

False Positive: The VDU incorrectly determines the space is occupied when the space is empty.

FMT Fixed Middle Tier. An alternative topology to TMT. The FMT is the conduit between the VDU and the VDS IG. The FMT is "fixed" as it is permanently in place in the field. The FMT may comprise wireless network nodes attached to parking meter or light poles or the like.

HHD Hand Held Device, for example running Windows CE, such as an O2 Atom

IIS Infringement Issuing Software

Parking Event: A parking event is the record of a vehicle arriving and departing a bay. The event is recorded as the arrival and the departure time of a vehicle.

PIN Parking infringement notice

PINS Parking infringement notice software

TMT Transient Middle Tier. The TMT is the conduit between the HHD and the VDU(s). The TMT is "transient" as it travels in the field with the Parking Officer and the HHD.

VDA Vehicle Detection Algorithm. A VDU firmware function that detects the presence of a vehicle over the unit.

VDS Vehicle Detection System

VDS IG Vehicle Detection System Internet Gateway.

VDU Vehicle Detection Unit. The unit which will be embedded into the ground. Contains a processor, a magnetic sensor and a communications module.

VIVA Vehicle In Violation Algorithm. This is a VDU firmware function that determines whether a given vehicle has lapsed into violation based on the presence of a vehicle as reported by the VDA.

The transient topology utilising a TMT is outlined in FIG. 1. Each VDU 110 is battery powered and embedded in the ground. To effect the transient topology shown in FIG. 1, each VDU 110 has the ability to detect the arrival and departure of a vehicle 120, by way of a three-axis magnetic sensor. The magnetic sensor reads the magnetic field at sufficiently regular intervals to detect a magnetic field disturbance created by a vehicle travelling at 20 kph or less. Each reading taken outside thresholds is passed to the VDA for determination of the presence of a vehicle, as discussed further in the following. The sensor utilises a 3-axis sensor, which takes readings in the X, Y, and Z axis of the sensor, and the sensor can be placed into a power saving mode. The VDU 110 runs a vehicle detection algorithm (VDA). The VDA takes readings from the sensor and determines the arrival and departure of the vehicle 120 as discussed further with reference to FIGS. 3*a* to 3*i*. The VDA is run in the firmware of VDU 110. Upon determination of the arrival of a vehicle 120 by the VDA, the VDU 110 also determines when the vehicle 120 moves into violation of parking restrictions. This is done by a VIVA (Vehicle In Violation Algorithm), which is run in the firmware of the VDU 110.

Upon determination of an actual or impending infringement, the VIVA initiates communications from the VDU 110 to the TMT 132, to alert the parking officer 130 of the infringement. This is effected by an RF communications component of the VDU 110. The RF communications component of the VDU 110 "listens when required" for the broadcast beacon from the TMT 132, and organises communications.

Each VDU 110 has onboard memory storage to store Parking Events, enabling the VDU 110 to upload data for prepopulation into the HHD 134 as required. Such data includes infringement data, parking event data, system health status, offence type (eg no standing), location details (physical), parking restrictions (eg signage), offence details such as arrival time and departure time, offence notes such as arrival time and time overstayed, and firmware details. Once the Parking Event data has been transferred, it is removed from the VDU 110. Further, the HHD 134 issues a confirmation message indicating that an infringement has been issued, which is received by the VDU 110 and causes the VDA to be reset.

As it is unlikely to be economic to replace the battery and/or VDU 110, each VDU 110 is configured to be highly power efficient on the basis that once the battery has been exhausted the life of the VDU will be over. One measure to provide for longevity is that each VDU 110 is operable to download updated firmware and firmware parameters (such as changed parking restrictions), as required.

The TMT 132 is the component associated with the HHD 134 and the Parking Officer 130. The TMT 132 communicates to the VDUs 110 and interfaces to the HHD 134. In this embodiment the TMT 132 is provided by wireless networking hardware positioned in the holster of the HHD 134. The communications between the TMT 132 and the HHD 134 occur via mini USB port. The HHD 134 and the TMT 132 thus have a permanent connection in place whereby communication can occur at any time. The TMT 132 is a "transient" middle tier as it travels in the field with the parking officer 130, and thus is not always available for communications with any given VDU 110.

The TMT 132 acts as a conduit, whereby it passes data between the HHD 134 and each VDU 110. No data is stored on the TMT 132. Data to be transferred to a VDU 110 from the HHD 134 is downloaded into the TMT 132 for transmission as required. Data to be transferred to the HHD 134 from the VDU 110 will be transmitted to the TMT 132 for upload to the HHD 134. The communication between the TMT 132 and each VDU 110 is by way of an RF link. Due to the transient nature of the TMT 132 and the need to establish a new wireless connection each time it comes into range of a VDU in violation, the TMT 132 issues a broadcast beacon which can be picked up by any VDU 110 within range. If a given VDU 110 responds, the TMT 132 will then schedule communications with the VDU 110 so as to establish the new connection.

The HHD 134 executes VDS portable system management console software and/or IIS software. When running the VDS portable system management console software, the HHD 134 has responsibility for management of all of the VDUs 110 in the field. This includes management of the installation of each VDU 110, including recording of the location details. It also includes routine maintenance of VDU firmware. The HHD 134 is pre-populated with the required database of details of VDU installation location and details. In this embodiment having a transient middle tier, at least at times when firmware updates are required, the HHD 134 is pre-populated with the required firmware and firmware parameters for download to each VDU 110.

When the IIS is being run on the HHD 134, the HHD 134 is responsible for receiving and processing of data from the TMT 132, including the storage of Parking Event data and System Health data for each VDU 110. When infringement details are acquired, the location of the associated VDU 110 and any other details required for the IIS to produce the infringement notice will be retrieved from an internal memory of the HHD 134 based on the details provided by the VDU 110. For example, the details of the internal memory may include a street-to-suburb mapping to enable the HHD 134 to include the suburb in the infringement notice. When an infringement has been issued the HHD 134 passes a message via the TMT 132 to the VDU 110 to reset the VDA so that a new monitoring period can commence.

Figure 2:
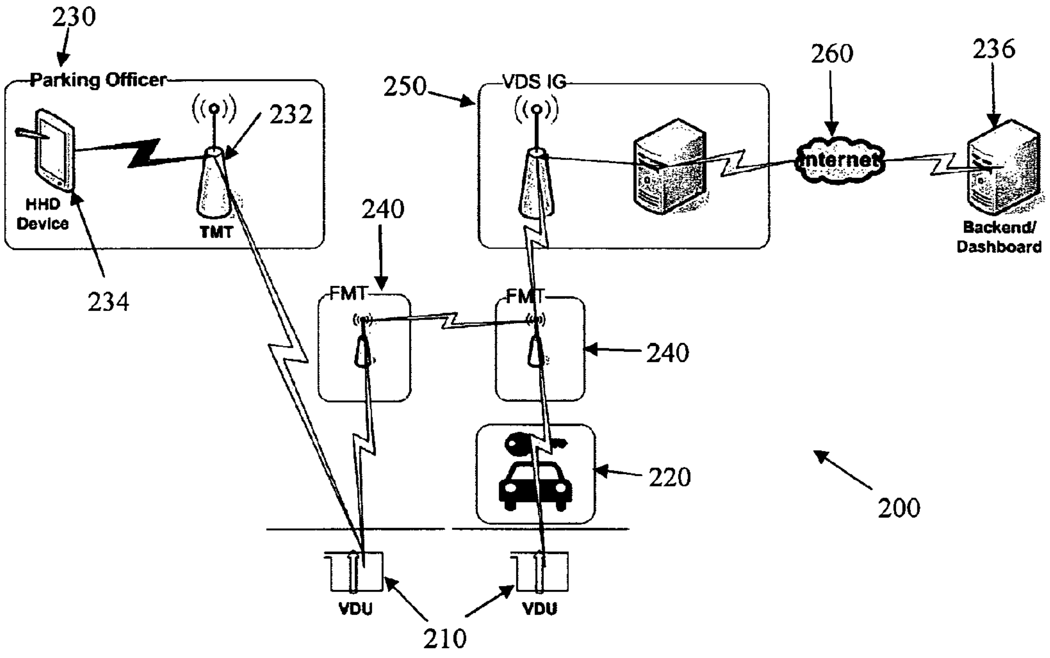
FIG. 2 illustrates a network topology comprising a fixed middle tier in accordance with an alternative embodiment of the invention.

While the TMT 132 described above and shown in FIG. 1 is a preferable solution due to the need for little or no fixed middle tier hardware, it is to be understood that the present invention includes within its scope fixed middle tier topologies communicating with vehicle detection units in accordance with the present invention. FIG. 2 illustrates a system 200 in accordance with one such fixed middle tier (FMT) topology.

The VDUs 210 in the system 200 provide most of the functions described above for the VDUs 110 of FIG. 1, which are not described again. In addition, each VDU 210 is operable to listen for the beacon signal of the FMT 240, when required. Upon detecting the beacon signal, the VDU 210 will perform the actions as outlined above as for the TMT 132. However, as infringement will only be issued by the HHD 234, the VDU 210 will continue to listen for the beacon signal of the TMT 232 when a vehicle 220 is in violation.

A transient middle tier 232 is provided in the embodiment of FIG. 2, however only infringement information would be transferred by TMT 232 as the other data would be sent via the FMT 240. The 234 HHD functions largely as defined above for the transient topology of FIG. 1. The fixed middle tier 240 of FIG. 2 is similar to the TMT 132 in that it communicates to each VDU 210, however the FMT 240 provides further capability beyond that of the TMT 132, namely to mesh network the data received from the VDUs 210 back to the VDS IG 250. The FMT 240 could be battery or mains powered and attached above ground to appropriate existing fixed infrastructure for example. When battery powered, the FMT 240 should be efficient in use of power, however unlike the VDUs 210 the battery of the FMT 240 can be replaced when exhausted.

The FMT 240 thus acts as a conduit, whereby it passes data from the VDUs 210 to other FMTs 240 or VDS IGs 250. No data is stored on the FMT 240. The FMT 240 is installed such that its broadcast receive range covers a wide range of VDUs 210 such that no single VDU 210 is within range of only one FMT 240, thus providing connection redundancy. The communication between the FMT 240 and the VDU 210 is effected by an RF wireless link. The FMT 240 issues a broadcast beacon signal which can be picked up by any VDU 210 within range. If a given VDU 210 responds, the FMT 240 schedules communications with that VDU 210. Once communications have been scheduled the data exchange between the VDU 210 and the FMT 240 includes Parking Infringement details, Parking Event data, Health Status information and Firmware details. The FMT 240 then passes this information over the Mesh network to the VDS IG 250. Again, the VDUs 210 erase any data that has been successfully transmitted to the TMT 232 and/or FMT 240, to minimise VDU memory requirements.

The VDS IG 250 is an internet gateway that has a connection to the internet 260. VDU information transferred to the VDS IG 250 via the FMT 240 is sent on to the parking inspector's dashboard monitor 236 or HHD 234. The VDS IG 250 is mains powered and communicates with many FMTs 240 at once. The backend 236 is a computer which receives data from the VDS IG 250 in real time. The backend 236 could be the dashboard monitor or other car-based computing device of a parking inspector 230, and is capable of displaying this information in a graphical nature for visual interpretation and analysis of the data being received.

Operation of VDUs 110, 210 thus includes communicability with either or both of a TMT 232 or FMT 240, depending on topology implemented. In preferred embodiments, each deployed VDU 110, 210 is capable of operating under either a fixed topology or a transient topology to allow topology changes without requiring physical replacement of the VDUs, such replacement being laborious and involving excavation of the roadway. Further, each VDU 110, 210 supports firmware updates and is able to reboot itself when instructed by the TMT or FMT, and can receive and install firmware updates. For example firmware configuration could include updated firmware version and components, configurable transmit intensity to provide compensation for changing wireless channel conditions, and configurable poll time. Each VDU 110, 210 further communicates a "known state" on request, and is able to be awoken for routine maintenance by a beacon signal from the TMT 132 and/or FMT 240.

Each VDU 110, 210 supports pre-programmed daylight savings time zones and exception days such as public holidays, and is able to communicate as required that it is in a "fault" state, allowing scheduling of maintenance. Each VDU 110, 210 is embedded about 2 centimeters below the surface of the parking space, and in this configuration can typically communicate with a TMT 132 and/or FMT node 240 that is 20 meters away. To conserve battery power, each VDU 110, 210 only attempts to detect the presence of the beacon signal of the TMT 132 and/or FMT 240 at times when communication is required. Such occasions include when the VIVA indicates a vehicle is in violation, when the predefined Parking Event storage limits have been met, when the system is in a "maintenance required" state, and when listening for a routine maintenance request.

A preferred feature enabling use of a transient middle tier in particular is that each VDU 110, 210 also transmits data required by the HHD 134 for the infringement in question, such as parking event data. As the VDU 110, 210 stores data representing both the parking space restrictions and the nature of the violation detected, this enables the HHD 134 to be provided with all necessary data to issue an infringement notice without requiring communications with a central server at the back end of the system.

Each VDU 110, 210 is further configured to establish communications with only one TMT 132 or FMT 240 at any given time, even when more than one TMT or FMT is in range.

Figure 3A:
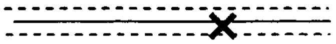
FIGS. 3*a* to 3*i* illustrate cases which influence operation of the vehicle detection algorithm in distinguishing parking events from exceptions.
Figure 3B:
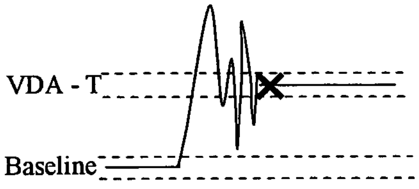
Figure 3C:
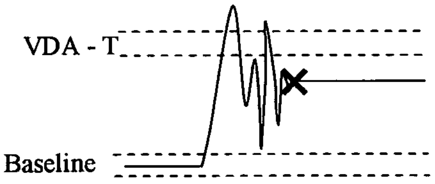
Figure 3D:
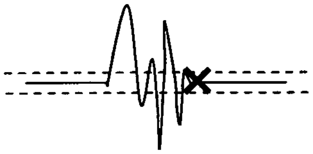
Figure 3E:
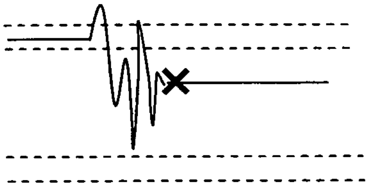
Figure 3F:
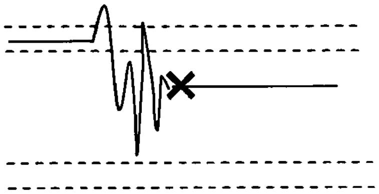
Figure 3G:
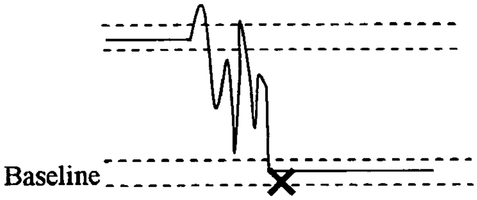
Figure 3H:
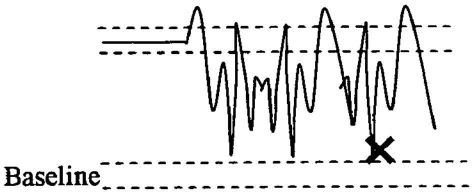
Figure 3I:
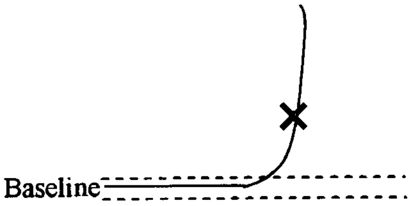
Figure 4A:
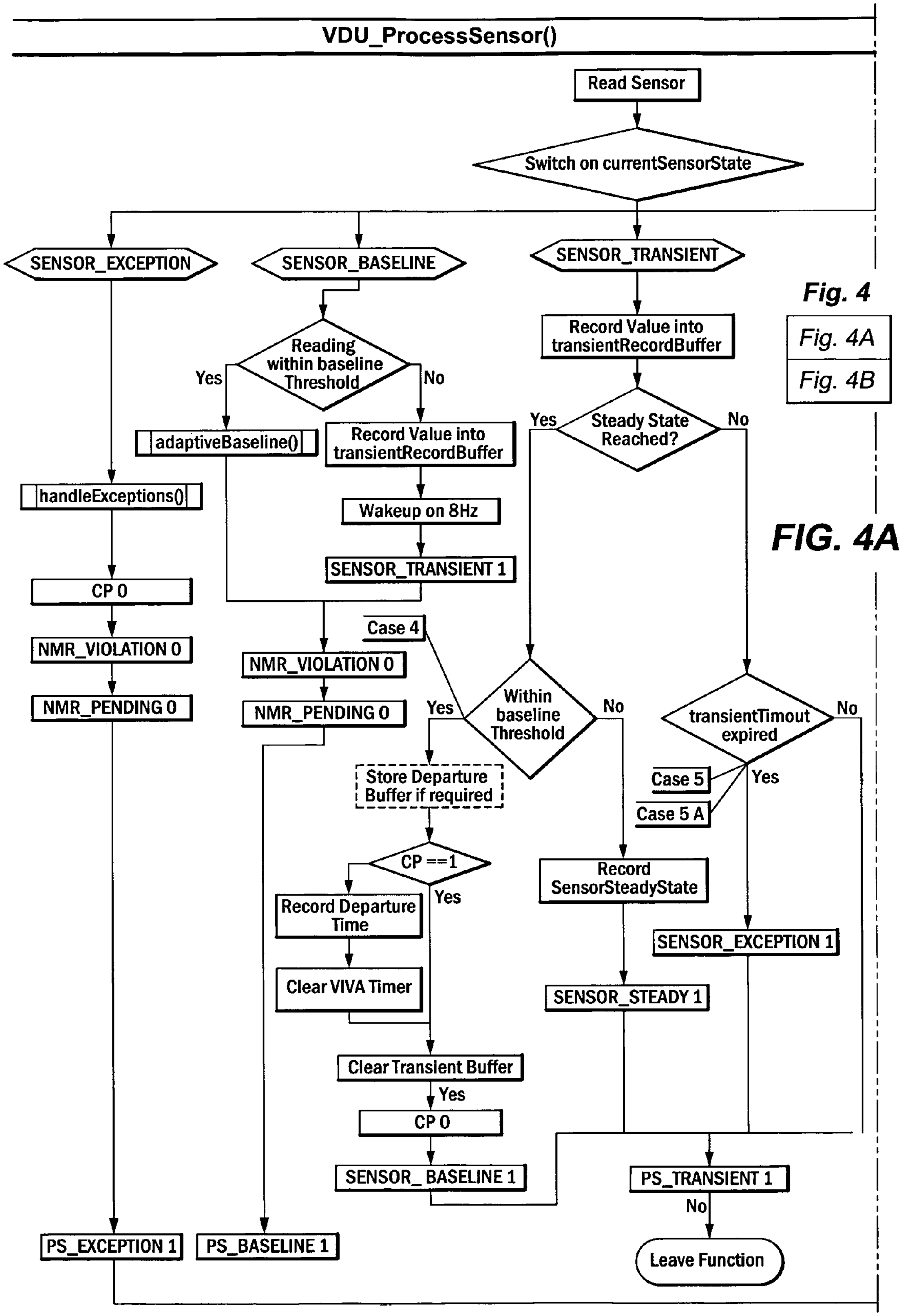
FIG. 4 is a flowchart illustrating operation of the vehicle detection algorithm.
Figure 4B:
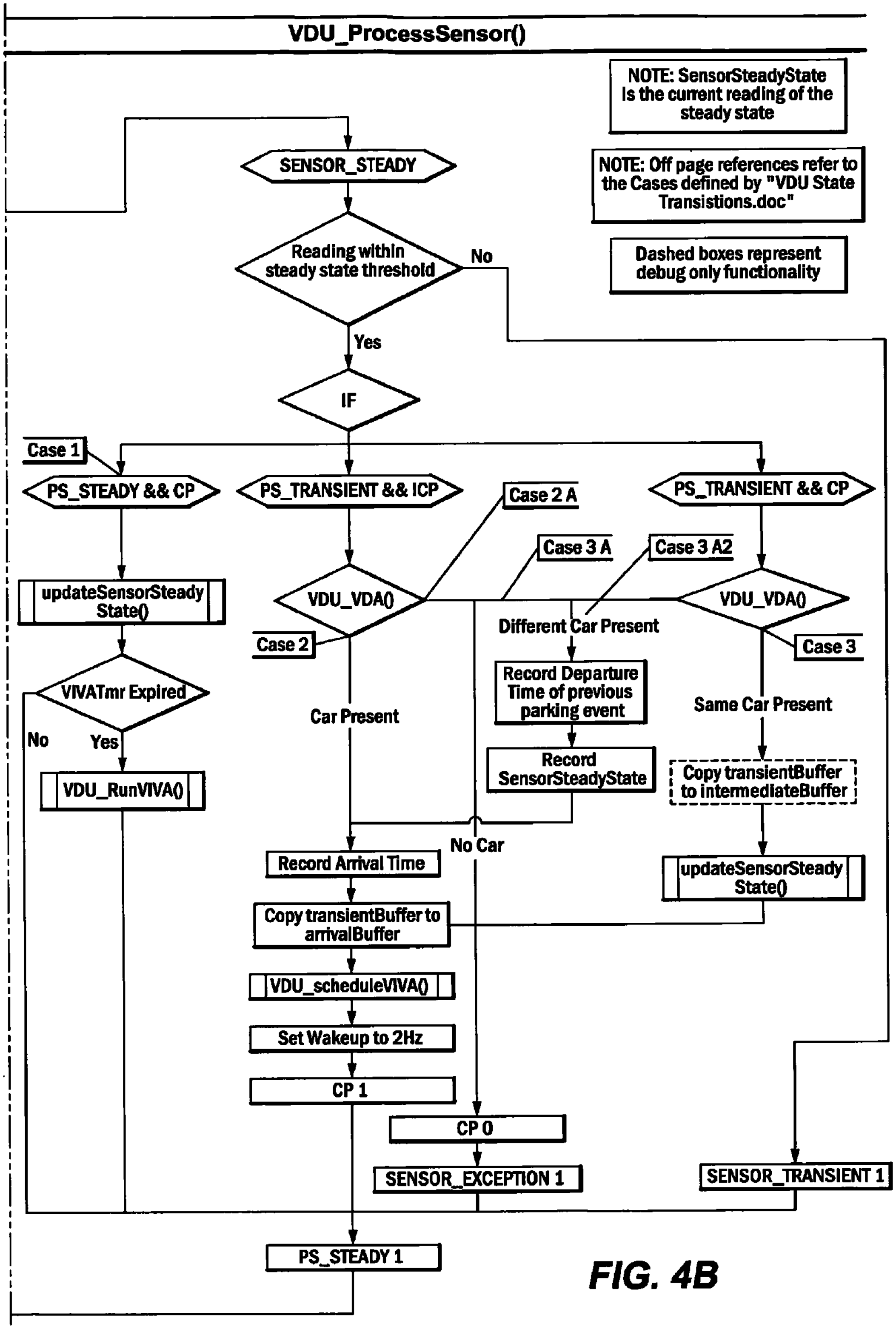

Each VDU 110, 210 runs a vehicle detection algorithm (VDA) which is illustrated in FIG. 4. The VDA is remotely updateable as part of a general firmware update. Any object that creates a disturbance to the magnetic field far greater than that created by a vehicle (such as a very strong magnet within the vicinity of the sensor) is to be treated as an exception, as discussed with reference to FIGS. 3*a* to 3*i*. Other situations which may trip the VDA into a false positive are also recorded as exceptions. Exceptions are reported as "space unoccupied" by default. The VDA enables the VDU to determine the arrival of a vehicle over the sensor, and determine the departure of a vehicle from over the sensor. The process of FIG. 4 is biased towards avoiding false positives, so as to minimise the chance of wrongly reporting a vehicle as being in violation when no violation actually occurred.

The VIVA algorithm operates on multiple time based triggers, supporting a minimum of 10 time changes in any operational period. The VIVA algorithm is updateable over the RF link, and being a firmware algorithm can be updated with a full firmware update. The VIVA configuration will be configurable via parameters over the RF link. Updating these parameters will not require a full firmware update, so that the VIVA configuration may for example implement a parameter driven daylight savings time period allowing simple parameter updates to effect changed daylight savings conditions. Similarly the VIVA configuration may implement parameter driven exception days, for example for parking limitations which apply except on certain days, thus providing for simple parameter updates to effect any changes in exception days.

The VIVA works in conjunction with the VDA to determine whether a vehicle is in violation. When required the VIVA initiates communication with the TMT 132 and/or FMT 240. Determinations made by the VIVA constitute parking event data, which is written to the memory of the VDU. The VIVA is further able to support pending violations, for example to indicate that a violation is imminent. The VIVA and/or system further provides for a configurable grace period, which may be afforded to a vehicle operator before issuance of an infringement notice is initiated.

In the embodiments described the parking officer is not able to print an infringement notice until the infringement signature information has been transmitted from the relevant VDU 110 to the HHD 134. However, in alternative embodiments this requirement may be omitted.

The systems of FIGS. 1 and 2 enable generation of data such as estimated average bay movements, including the number of expected infringements in a given day, how long until the car leaves (at which time the VDU can stop "listening"), how long until the infringement notice is issued (after which the VDU can stop listening), and how often the enforcement officer comes past any given VDU.

Each state outlined in the following falls into different sections of the state machine defined for the VDU by FIG. 4. Each case has a description and an indication of where it fits into the state machine flow chart.

Case 1

This case is illustrated in FIG. 3*a* and occurs when a steady state has previously been reached, the VDA run and a car has been identified as occupying the bay.

| Pre conditions | | Post conditions | Effect on VDA |
|---|---|---|---|
| Previous State<br>Car Present<br>Current State | Steady<br>TRUE<br>Steady | Value recorded for adaptive steady state | VDA is not run |

Case 2

This case is illustrated in FIG. 3*b* and occurs when a car first arrives, the steady state is realised after a transient phase, once the VDA identifies a car is present the arrival time and arrival signal are stored.

| Pre conditions | | Post conditions | Effect on VDA |
|---|---|---|---|
| Previous State<br>Car Present<br>Current State | Transient<br>FALSE<br>Steady | Arrival Buffer is stored<br>Arrival Time is recorded | VDA is run and returns TRUE |

Case 2—Alternative

This case is illustrated in FIG. 3*c* and has the same preconditions as case 2 but when the VDA is run a result of no car present is returned. This means the steady state reached, or the arrival signal cannot possibly be a car. In this case the system transitions to an exception state.

| Pre conditions | | Post conditions | Effect on VDA |
|---|---|---|---|
| Previous State<br>Car Present<br>Current State | Transient<br>False<br>Steady | EXCEPTION state is realised | VDA is run and returns FALSE |

NOTE:
The VDA returns false for the steady state reached

Case 3

This case is illustrated in FIG. 3*d* and occurs when a car has previously been identified by the VDA and an external factor interrupts the field, when a steady state is again realised the VDA is run and determines the same car is present. In debug mode this intermediate signal can be stored.

| Pre conditions | | Post conditions | Effect on VDA |
|---|---|---|---|
| Previous State<br>Car Present<br>Current State | Transient<br>TRUE<br>Steady | Intermediate buffer is stored | VDA is run and returns TRUE |

Case 3—Alternative

This case is illustrated in FIG. 3*e* and is similar to case 3 but when the VDA is run after reaching steady state from a transient state a result of no car present is returned. In this case the VDA has determined that the steady state reached cannot be either the same car or a different car. In this case the system switches to exception state.

| Pre conditions | | Post conditions | Effect on VDA |
|---|---|---|---|
| Previous State | Transient | EXCEPTION state is realised | VDA is run and returns FALSE |
| Car Present | TRUE | | |
| Current State | Steady | | |

NOTE:
New Steady State is outside recorded steady state value when VDA returned TRUE Case 3—Alternative #2 (VDA Returns True Due to Different Car Being Present)

This case is illustrated in FIG. 3*f* and is similar to case 3 but when the VDA is run after reaching steady state from a transient state the result denotes that a different car is present. In this case the VDA has determined that the previous car has left and a new car has arrived. Therefore the departure time must be noted, the arrival signal of the new car stored and the arrival time noted.

| Pre conditions | | Post conditions | Effect on VDA |
|---|---|---|---|
| Previous State | Transient | Previous car departure time stored | VDA is run and returns DIFFERENT__CAR |
| Car Present | TRUE | transientBuffer stored as arrival buffer | |
| Current State | Steady | Arrival time stored. | |

NOTE:
New Steady State is outside recorded steady state value when VDA returned TRUE Case 4

This case is illustrated in FIG. 3*g* and is the case where the car has departed and the steady state reached is the baseline state. The departure time is stored and the departure signal may be stored if in debug mode.

| Pre conditions | | Post conditions | Effect on VDA |
|---|---|---|---|
| Previous State | Transient | Departure buffer is stored | VDA is not run |
| Car Present | TRUE | Departure Time is stored | |
| Current State | Baseline | | |

Case 5

This case is illustrated in FIG. 3*h* and is the case when the transient timeout expires, which means that a steady or baseline state has not been reached fast enough. In this case the system switches to exception state.

| Pre conditions | | Post conditions | Effect on VDA |
|---|---|---|---|
| Previous State | Transient | EXCEPTION state is realised | VDA is not run |
| Car Present | TRUE/FALSE | | |
| Current State | Transient | | |

NOTE:
Max Transient Duration expired

Case 5—Alternative

This case is illustrated in FIG. 3*i* and is the case when the transient timeout expires, which means that a steady or baseline state has not been reached fast enough. In this case the system switches to exception state.

| Pre conditions | | Post conditions | Effect on VDA |
|---|---|---|---|
| Previous State | Transient | EXCEPTION state is realised | VDA is not run |
| Car Present | TRUE/FALSE | | |
| Current State | Transient | | |

NOTE:
Reading does not stabilise within timeout

Each VDU 110, 210 has several registers, which allow the run time state of the VDU to be maintained. A Car Present Flag denotes whether the VDA has determined if a car is present or not, and is used when determining which transition case has occurred. A Network Status Register allows the VDU to keep a record of its connectivity to the network when coming out of a sleep cycle. The flags can be checked to determine what network state the VDU was in before sleeping. A NETWORK ASSOCIATED bit represents whether the VDU has successfully joined a network. A NETWORK_JOIN_REQUEST bit is used to signify whether the VDU wishes to establish a wireless connection, and when set, the VDU will try and join a network.

A network message request register of the VDU is used to store the type of message the VDU wishes to exchange with a TMT. Multiple bits can be set indicating more than one type of data exchange is desired. Upon being asked by a TMT the type of exchange required this register is used as a return data.

An ADMIN bit indicates whether the VDU wishes to exchange Admin based commands, and a VIOLATION bit indicates the VDU wishes to inform a TMT a violation has occurred. A PENDING_VIOLATION indicates the VDU wishes to inform the TMT of a pending violation, and a SYSTEM-HEALTH bit indicates the VDU wishes to inform the TMT of its system health status, such as battery level. A PARKING_EVENTS bit indicates whether the VDU wishes to transfer its parking event data to a TMT, while an EXCEPTION bit indicates whether the VDU is in exception state and needs to inform a TMT of this.

A sensor state register of the VDU is used to store the current state of the VDU. The enabled bit will always be set when sensor readings are required, and this state can be used in conjunction with any other state. Any other combinations of state are prohibited.

An ENABLED bit indicates whether the VDU should read the sensor in its main loop. A BASELINE bit indicates whether the VDU is in a baseline state, while a TRANSIENT bit indicates whether the VDU is in a transient state. A STEADY bit indicates whether the VDU is in a steady state, and an EXCEPTION bit indicates whether the VDU is in an exception state. A SUSPENDED_SLEEP bit indicates whether the VDU is in a suspended sleep state, used to make the VDU sleep for long periods such as overnight or on weekends.

A previous state runtime variable of the VDU is used to store the last state the VDU was in. The previous state may only ever be a single state, multiple previous states are prohibited. The previous state is used when determining the type of transition that has occurred and any subsequent action that should follow.

A BASELINE bit indicates whether the VDU was previously in baseline, while a TRANSIENT bit indicates whether the VDU was previously in transient state. A STEADY bit indicates whether the VDU was previously in steady state, and an EXCEPTION bit indicates the VDU was previously in exception state. A SUSPENDED_SLEEP bit indicates whether the VDU was previously in suspended sleep state.

Figure 5:
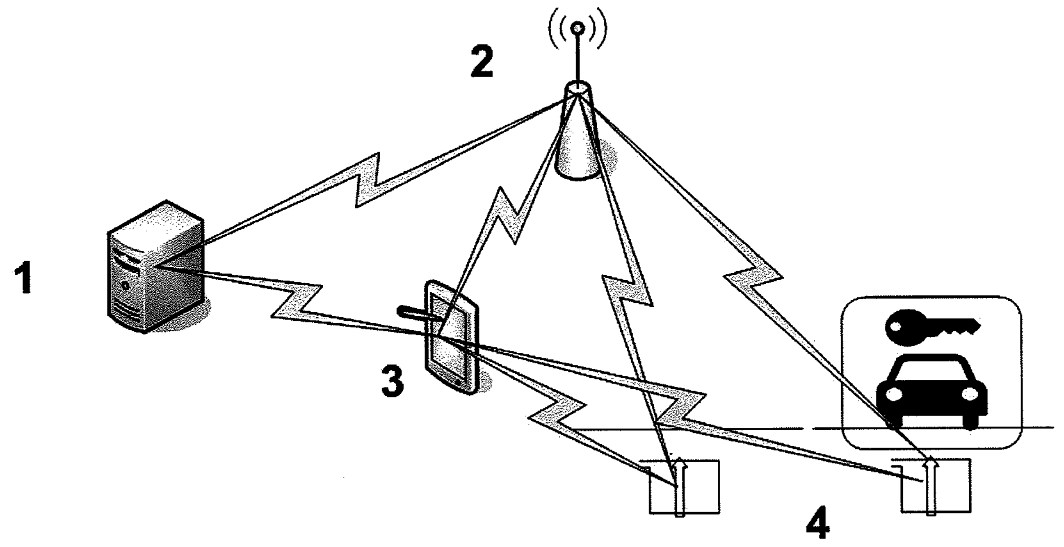
FIG. 5 illustrates the generalised network topology of a further embodiment of the present invention.
Figure 6:
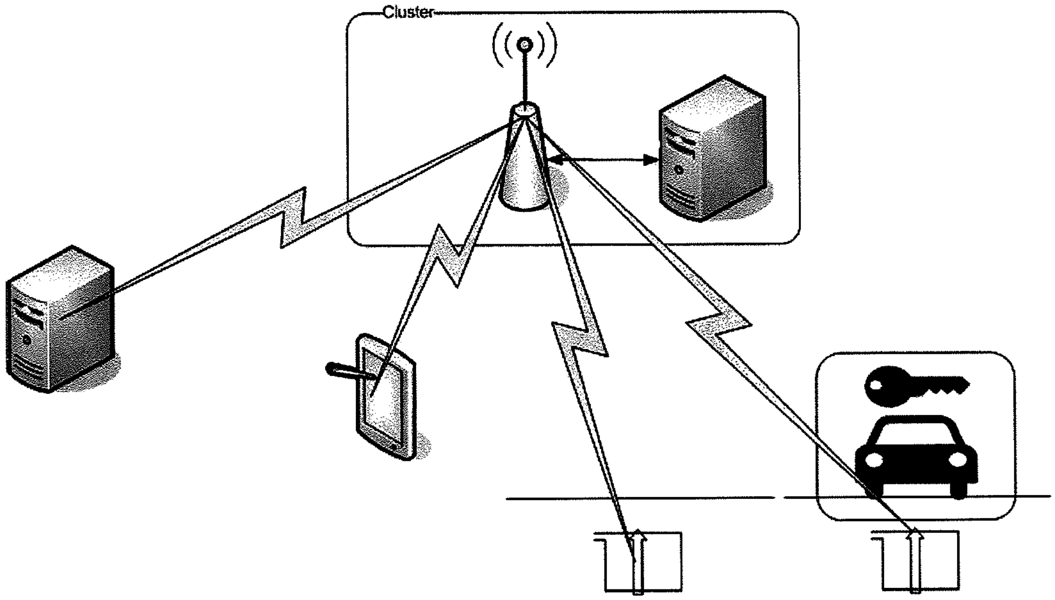
FIG. 6 illustrates operation of a “smart” VDU in accordance with another embodiment of the present invention.

FIG. 5 illustrates the generalised network topology of a further embodiment of the present invention, and outlines the various components required for the system of this embodiment to operate. These components and options for structure and intelligence of each are first outlined, and then subsequently examined in greater detail. The backend system 1 provides for configuration, processing and storing of data. In particular, the backend system 1 provides a conduit for the entry of street names and for the identification and recording of the location of each VDU. For example, when a detector is placed in the ground, its location is to be recorded. This location will then be used to identify the details required in order to issue an infringement notice to an offending vehicle. The backend system 1 further provides backend processing of all PINs, and also stores all signage information so as to be able to determine if a vehicle has committed an offence.

In this embodiment the backend 1 is a dashboard device and must also thus provide for dashboard functionality such as aggregating data to facilitate a dashboard overview of data across multiples VDUs and multiple HHDs. The back end system 1 also communicates with VDUs 4 (via the wireless communication channel) and, as required, upgrades software running in the VDU, determines if a given VDU is operating as expected, downloads data from the VDUs for aggregation, and communicates with the handheld device 3 for example to inform it of the presence of a vehicle.

The middle tier 2 is the layer between the VDUs 4 in the ground on the one hand, and the backend system 1 and/or HHD 3 on the other hand. That is, the middle tier 2 communicates with both the VDUs 4 and the backend system 1 and/or HHD 3. Depending on the end architecture and design, the middle tier 2 may be required to communicate information to the hand held devices 3, store details and data being received from the VDUs 4, aggregate data and send it to the backend system 1, and communicate with the VDUs 4 to determine device health.

The hand held device (HHD) 3 is carried by a parking officer, and receives communications regarding the details of an infringement (or pending infringement) and is provided with "pre populated" details which are automatically passed into the PINS for processing by the officer. The data fields provided for automated pre-population include Offence Type, Offence Date and Time, Offence Location (e.g Street No., Street Name, Suburb), Parking Bay Identifier, Vehicle Arrival Time, Vehicle Stay Duration, Location Information (e.g. Side of Street, Between Streets, Near <Descriptor>), Parking Sign Information (e.g 1P Mon-Fri, 8:00 am to 6:00 pm, No Exemptions), Parking Restriction and Officer Notes. Such communications could arrive from the back-end system 1, from a middle tier 2 separate to the HHD, or directly from the VDUs 4.

The Vehicle Detection Units (VDUs) 4 are placed into the ground beneath each vehicle parking space. The readings taken by a sensor of each unit are used by the vehicle detection algorithm (VDA) run by the VDU to determine the presence of a vehicle. Depending on the end architecture and design, each VDU 4 may be required to send a signal identifying itself, send a signal defining the magnetic field reading, send a signal defining the presence of a vehicle over the detector, send a signal defining the history of vehicle movements within the bay, and/or be able to download new firmware as required.

In using the readings of the sensor, the VDU 4 has the capability to calculate and store an averaged baseline for the "background reading" for the detector, and in determining this background reading the VDU has the capability to take into account variations in the temperature and other factors that may affect the detector. Each VDU 4 stores the temperature for a "reasonable period" and the background reading for a "reasonable period", and determines the affect of the background reading on temperature, and applies this to the calculation. Each VDU 4 holds signage information and goes into a power saving mode at times when restrictions do not apply.

The VDUs 4 are also able to download new firmware algorithms as required, reboot themselves, receive a signal instructing a change in the frequency of the sensor readings, receive a signal instructing a change in the frequency at which a signal is sent to the listening devices 2, 3 indicating the presence of a vehicle, and upload any stored data. An advantage of a VDU having such wireless connectivity is that the topologies of FIGS. 1, 2 and 5 do not specifically require a 3$^{rd}$ party wireless network. Further, the ability of the VDU to execute the VDA allows the VDU to communicate to the listening devices 2, 3 that a vehicle is present and for how long it has been present.

Figure 7:
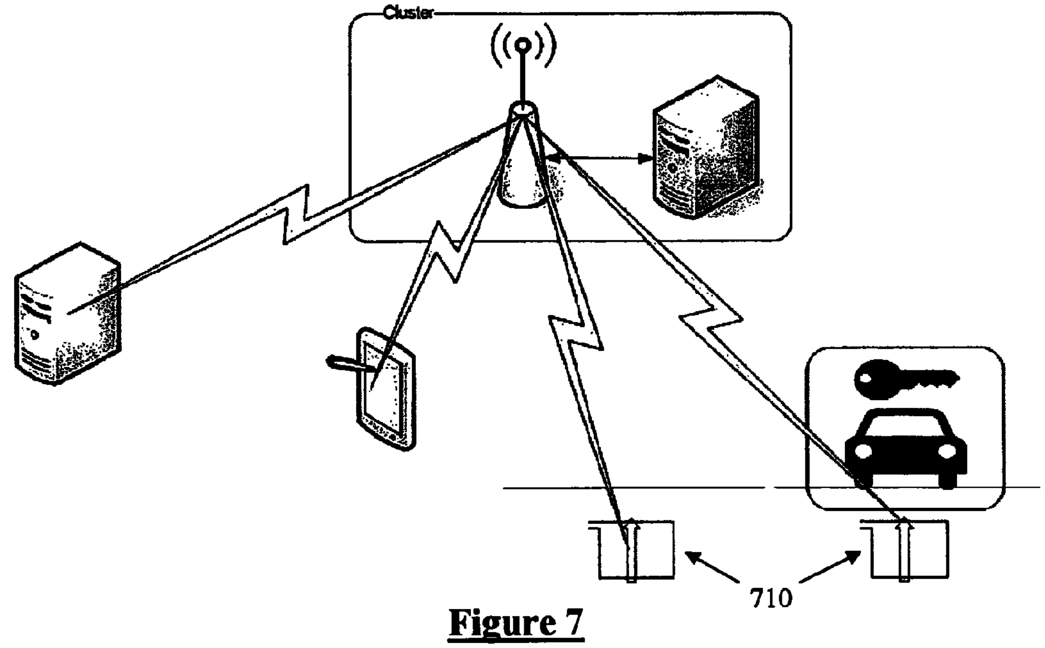
FIG. 7 illustrates operation of an “intelligent” VDU in accordance with yet another embodiment of the present invention.

FIG. 7 illustrates operation of an "intelligent" VDU 710 in accordance with yet another embodiment of the present invention. This topology is in a number of ways the same as the "smart" VDU described with reference to FIG. 5, except as set out below. In this embodiment the VDUs 710 store each reading, such as the readings of FIG. 3, for a period of time (say 1 month). The VDU 710 determines if a vehicle has infringed by referring to signage details of the bay stored by the VDU 710. Such stored signage details include definition of date and time details, and for each uniquely designated period, the allowed length of stay, the start time and the end time. An advantage of the intelligent VDU is that the VDU is able to communicate to the listening device the fact that the vehicle is in violation, and is not required to continuously broadcast the "vehicle present" signal.

A "dumb" middle tier may be employed in some embodiments. In this scenario the middle tier acts like a router and passes all data received from the VDUs on to the backend system supplying only secure communications and ensuring that all signals received are passed on and subsequently received at the other end. This system could be used in conjunction with either Intelligent or Smart VDUs. The VDUs behave as outlined above, the dumb middle tier will receive signals from all VDUs that it is configured to receive data from, and then securely transmits this data to the backend system. The backend system communicates this data to any HHD that requests or requires the information. This communication could be done via the middle tier's wireless network already in place, or alternatively via GPRS or other wireless network to the HHDs in the field The data includes street details and infringement details for issuing of a PIN.

Advantages of the dumb middle tier include that the risk of over engineering is small with this solution, the cost impost of providing this "router" is less than having a complete computer system deployed into the field, and there is one central redundant backend system which is fully tunable and upgradeable as opposed to many deployed remote smart middle tiers or deployed remote smart VDU's.

Figure 8:
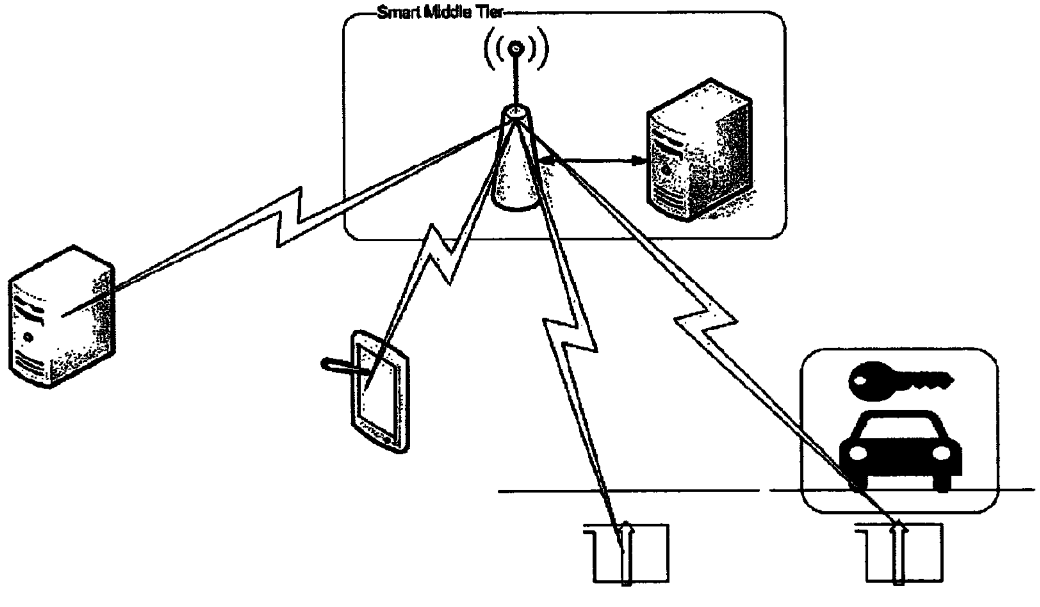
FIG. 8 illustrates operation of a “smart” middle tier together with “smart” VDUs, in accordance with a further embodiment of the present invention.

In still further embodiments a smart middle tier (with smart VDUs) may be deployed. In this scenario the middle tier provides the sophisticated functionality of the backend head office system, including receiving signals from the VDUs and storing this data in its own database. The topology of this system is illustrated in FIG. 8. This system would work as follows. The Smart VDUs behave as outlined above, the smart middle tier will receive signals from all VDU's that it is configured to receive data from. The smart middle tier is constantly broadcasting wake-up messages on the designated frequency to all VDU's that are within range. Once a VDU comes within range of the smart middle tier, it responds to the connect message back to the smart middle Tier. The smart middle tier then handshakes with the VDU and requests data indicating how long the vehicle has been above the VDU (0 mins for no vehicle present), the MAC address of the VDU, and the vehicle movement in the bay since the VDU last spoke to the smart middle tier The middle Tier would then subsequently be responsible for determining if the vehicle in that bay is in violation of parking, communicate to a HHD which bay has a vehicle over it, and pass street details and infringement details to the handheld device for issuing of a PIN. Advantages if the smart middle tier include that by using smart VDU's, a permanent connection to the smart middle tier is not required in order to detect the presence of a vehicle. Subsequently the infrastructure costs are reduced as it is not required to affix the middle tiers to infrastructure every 100 meters or so. Further, this topology does not require a 3rd party permanent wireless network to communicate to the hand held devices. This would be done in a piece meal basis, by the smart middle tier as violations are detected. Also, HHDs communicate via the middle tier (and not the VDU's), and a smaller set of communications is required for both the VDU and hand held. The handheld receives infringement data and the street details, and is not required to have this data stored and determine the bay details from its internal database. This topology also lowers battery requirements due to the VDU only communicating when the smart middle tier comes within range.

The topology of FIG. 8 does not require a permanent connection to any backend system. Moreover, use of a smart VDU means the smart middle tier is only required to communicate to the back end and the VDUs in a piecemeal fashion, for example upon docking at the end of a working day. The topology of FIG. 8 allows the smart middle tier to be mobile as it is not always required to be calculating the presence of a vehicle in any particular space. Further, any firmware upgrade of the VDUs can be done via the smart middle tier, and the VDUs are required to only store the details of vehicle movements since the last time that the smart middle tier communicated. The VDUs only have to communicate when asked which extends VDU battery life. The backend system is only required to know about the signage, which is transferred to the smart middle Tier, and only what is required to be printed for the PIN is passed to the HHD.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

The claims defining the invention are as follows:

1. A vehicle detection unit (VDU) comprising:

a sensor for outputting a sensor signal caused by occupancy of a vehicle space by a vehicle;

a storage device carrying parameters which define notifiable vehicle space occupancy events;

a processor operable to process the sensor signal to determine occupancy status of the vehicle space, and operable to compare the occupancy status of the vehicle space with the parameters in order to determine whether a notifiable event has occurred, and operable to initiate a communication from the vehicle detection unit to a supervisory device upon occurrence of a notifiable event, wherein the communication includes data items pertaining to the notifiable event and communicated in a format suitable for pre-population into infringement issuing software.

2. The vehicle detection unit of claim 1, wherein the communication is wireless and directly with a portable supervisory device.

3. The vehicle detection unit of claim 2 wherein the communication is established in an ad-hoc manner at times when a notifiable event has occurred and when the portable supervisory device is in range.

4. The vehicle detection unit of claim 1 wherein the communication is with a fixed supervisory device effecting a fixed middle tier.

5. The vehicle detection unit of claim 1, wherein the communication includes information associated with the notifiable event in a format suitable for automated population of such information into infringement issuing software of the supervisory device to facilitate issuance of an infringement notice.

6. The vehicle detection unit of claim 1 wherein the data items comprise at least one of: street name, parking bay number, vehicle occupancy duration, offence details, applicable regulations, applicable monetary fine, and historical usage data.

7. The vehicle detection unit of claim 1 wherein the notifiable event comprises at least one of: occurrence of a parking violation, an imminent parking violation, a non-violating parking event of interest, and a change in occupancy status of the vehicle space.

8. The vehicle detection unit of claim 1 and further configured to be embedded in the roadway beneath an associated vehicle space.

9. The vehicle detection unit of claim 1 wherein the sensor comprises a magnetometer able to sense variations in magnetic field caused by the arrival, presence, departure or absence of a vehicle.

10. The vehicle detection unit of claim 9 wherein the magnetometer is a 3-axis magnetometer able to sense components of the magnetic field in x, y and z directions.

11. The vehicle detection unit of claim 1 wherein the processor is configured to execute a vehicle detection algorithm to determine whether detected variations in the sensor signal are caused by a vehicle.

12. The vehicle detection unit of claim 1 wherein the parameters are provided in firmware, and wherein the vehicle detection unit when deployed is operable to receive firmware updates to the parameters.

13. A method for vehicle detection by a vehicle detection unit, the method comprising:

the vehicle detection unit sensing occupancy of a vehicle space by a vehicle and outputting a sensor signal;

the vehicle detection unit retrieving from a storage device of the vehicle detection unit parameters which define notifiable vehicle space occupancy events;

the vehicle detection unit processing the sensor signal to determine occupancy status of the vehicle space, the vehicle detection unit comparing the occupancy status of the vehicle space with the parameters in order to determine whether a notifiable event has occurred, and the vehicle detection unit initiating a communication from the vehicle detection unit to a supervisory device upon occurrence of a notifiable event, wherein the communication includes data items pertaining to the notifiable event and communicated in a format suitable for pre-population into an infringement issuing device.

14. The method of claim 13 wherein the sensor signal is processed in a manner to emphasise variations in the z-axis (vertical axis) of the magnetic field.

15. The method of claim 13, wherein the communication is wireless and directly with a portable supervisory device.

16. The method of claim 15 wherein the communication is established in an ad-hoc manner at times when a notifiable event has occurred and when the portable supervisory device is in range.

17. The method of claim 13 wherein the communication is with a fixed supervisory device effecting a fixed middle tier.

18. The method of claim 13 wherein the data items comprise at least one of: street name, parking bay number, vehicle occupancy duration, offence details, applicable regulations, applicable monetary fine, and historical usage data.

19. The method of claim 13 wherein the notifiable event comprises at least one of: occurrence of a parking violation, an imminent parking violation, a non-violating parking event of interest, and a change in occupancy status of the vehicle space.

20. The method of claim 13 wherein the processing comprises executing a vehicle detection algorithm to determine whether detected variations in the sensor signal are caused by a vehicle.

21. The method of claim 13 wherein the parameters are provided in firmware, and further comprising receiving firmware updates to the parameters.

22. A system for detecting vehicle parking infringements, the system comprising:

a plurality of vehicle detection units (VDUs) each associated with a respective vehicle parking space and storing parameters defining notifiable vehicle space occupancy events, each VDU configured to sense occupancy of the associated vehicle space and determine by reference to the parameters whether a notifiable event has occurred, and operable to communicate wirelessly including wirelessly transmitting data items pertaining to the notifiable event and communicated in a format suitable for pre-population into infringement issuing software;

a mobile supervisory device configured to wirelessly communicate with each respective VDU when brought within range, to receive information from the VDU arising from a notifiable parking event detected by the VDU, to pre-populate received data items into infringement issuing software and to generate a parking infringement notice using the pre-populated data items obtained from the VDU.

23. The system of claim 22 wherein the mobile supervisory device is a portable digital device carried by a parking inspector.

24. The system of claim 22 wherein the mobile supervisory device is vehicle mounted.

25. The system of claim 22 wherein the supervisory device collates data from a plurality of VDUs for simultaneous display to a parking officer.

* * * * *